United States Patent [19]

Albert et al.

[11] 4,124,730

[45] * Nov. 7, 1978

[54] METHOD OF PRODUCING ORGANIC SHORT FIBERS AND TREATMENT THEREOF WITH A SILANE

[75] Inventors: Frank D. Albert, Clearwater; Alan P. Conroy, Tampa; David L. Skinner, St. Petersburg, all of Fla.

[73] Assignee: Jim Walter Resources, Inc., Birmingham, Ala.

[*] Notice: The portion of the term of this patent subsequent to May 31, 1994, has been disclaimed.

[21] Appl. No.: 801,231

[22] Filed: May 27, 1977

Related U.S. Application Data

[63] Continuation-in-part of Ser. No. 564,731, Apr. 3, 1975, Pat. No. 4,026,478.

[51] Int. Cl.$^2$ ............................................. B05D 7/00
[52] U.S. Cl. ...................................... 427/220; 241/24; 427/292; 427/387; 427/399; 428/391; 428/392
[58] Field of Search .................. 65/4 R, 5, 6, 7, 10, 65/3 R, 3 C; 428/87, 92, 391, 392; 241/28, 30, 24, 261.2, 261.3; 427/399, 220, 292, 387, 444; 260/448.2 N, 448.2 B

[56] References Cited

U.S. PATENT DOCUMENTS

| | | | |
|---|---|---|---|
| 2,083,132 | 6/1937 | Williams et al. | 65/3 R |
| 2,206,060 | 7/1940 | Slayter | 65/5 |
| 2,255,071 | 9/1941 | Marco | 241/261.3 |
| 2,587,710 | 3/1952 | Downey | 65/6 |
| 2,646,593 | 7/1953 | Downey | 65/10 |
| 2,854,355 | 9/1958 | Motter et al. | 427/387 |
| 3,257,182 | 6/1966 | Nystrom | 65/6 |
| 3,278,476 | 10/1966 | Santelli | 427/387 |
| 3,308,945 | 3/1967 | Oja | 65/10 |
| 3,341,356 | 9/1967 | Collier | 427/387 |
| 3,493,461 | 2/1970 | Sterman et al. | 427/387 |
| 3,615,009 | 10/1971 | Norton | 209/139 A |
| 4,026,478 | 5/1977 | Albert et al. | 65/2 |

Primary Examiner—Ronald H. Smith
Assistant Examiner—Sadie L. Childs
Attorney, Agent, or Firm—Littlepage, Quaintance, Murphy, Richardson and Webner

[57] ABSTRACT

The present invention concerns a novel method of making short silane treated inorganic glass fibers and mineral wool fibers with a very low shot content and the fibers thus produced.

7 Claims, No Drawings

METHOD OF PRODUCING ORGANIC SHORT FIBERS AND TREATMENT THEREOF WITH A SILANE

CROSS-REFERENCE TO RELATED APPLICATIONS

This application is a Continuation-in-Part of U.S. application Ser. No. 564,731, filed on Apr. 3, 1975, now U.S. Pat. No. 4,026,478.

BACKGROUND OF THE INVENTION

1. Field of the Invention

This invention is directed to the manufacture of very short inorganic glass fibers and mineral wool fibers with low shot content in a controlled range of aspect ratios. Aspect ratio may be defined as the ratio of fiber length to fiber diameter and is expressed as a dimensionless number. Shot is generally formed from cooled slag which has failed to be fully attenuated in the mineral wool manufacturing process. The short glass or mineral wool fibers can be used as reinforcing agents in plastics.

2. Description of the Prior Art

Mineral wool fibers have been manufactured for a long time and are well known in the art. There are two commercial methods in current use for making mineral wool fibers. One of these methods is performed on an apparatus which uses a single dish-shaped rotor with steam attenuation to form the fibers. The rotor may be in a vertical or horizontal plane. Typical apparatus of this type is shown in the following U.S. Pats.: No. 3,022,538, issued on Feb. 27, 1962 to C. B. Setterberg, No. 2,328,714, issued on Sept. 7, 1943 to D. C. Drill, and No. 2,944,284, issued on July 12, 1960 to W. T. Tillotson et al. The other convention method uses multiple rotors which hurl a molten stream of liquid melt against their outer rims in sequence to form the mineral wool fibers. Typical apparatus of this type is shown in the following U.S. Pats.: No. 3,045,279 — W. K. Hesse, issued July 24, 1962; No. 2,991,499 — H. E. Holcomb, issued July 11, 1961, and No. 2,561,843 — J. E. Coleman, issued July 24, 1941.

It should be noted that while some of these patents disclose apparatus for separating shot from fibers, none of them disclose a method of producing a very short mineral wool fiber. Rather the teachings of disclosures are directly opposed to that of shortening the fiber. Generally, these fibers are used in the form of long fibers which can be intertwined to form a nonwoven mat or held together by a binder to form a rigid board. Under these prior art conditions, it is desirable to have the fibers relatively long.

More particularly, mineral wool fibers have heretofore been used as heat insulation material in paper-enclosed batts, as reinforcing agents in spray-on heat insulation, or as fibers in rigid acoustical panels and tiles. For all of these applications, there is no need to shorten the length of the fibers as they are formed. In fact, it is generally preferred that the fibers be as long as possible with a large aspect ratio.

In many applications, efforts have been made to separate shot from mineral wool fibers.

Conventionally an air elutriation method is used to separate shot from fibers. This method usually has a stream of air which moves the fibers in an upward arc. It is well known that the shot particles have a much higher weight-to-length ratio than the fibers which are generally long and slender. The air stream not only separates the shot from the fibers because of the difference in response of the shot and the fibers but the air also, to some extent, breaks some of the shot away from the fibers to which it is attached.

In addition, the fibers and shot may be separated by using water as the separating medium. However, this latter method requires an additional drying step which makes the process less attractive than air elutriation.

The method of producing long glass fibers from a molten mass has long been known. Generally, a mass of glass marbles are melted in a heating unit and fine filaments of glass are extruded through small holes in the bottom of the heating unit. These filaments are then collected on spools or in an unwoven mat. Often the filaments are accumulated into bundles which are held together by a binder to give added strength. It is also known to cut or chop the fibers into shorter lengths.

It has also long been known to use defibrating or refining apparatus for reducing wood or cellulosic chips to individual fibers. In the defibrating or refining apparatus, wood chips are rubbed against one another until the result is a mass of long individual cellulose fibers which then can be felted into paper or fiberboard. However, in the process, it is desirable to keep the fibers as long as practicable, as very short fibers are useless for making paper or fiberboard.

The short fibers of the present invention when mixed with resin enhance the physical properties of the resultant filled resin. It is, however, desirable to maximize this enhancement and to also produce filled resins with improved resistance to moisture.

SUMMARY OF THE INVENTION

The present invention is directed to a novel process in which inorganic glass or mineral wool fibers are shortened to within a limited range of lengths in a continuous process.

It is an object of the present invention to provide a novel method for separating shot from mineral wool fibers.

It is another object of the present invention to provide a novel method for making glass or mineral wool fibers within a relatively narrow range of aspect ratios.

It is yet another object of the present invention to provide a novel method for making mineral wool fibers with a minimum of shot in a continuous process.

Still another object of the present invention is to provide a novel method for improving the physical properties of resins filled with short shot-free fibers.

Yet another object of the present invention is to provide a novel method for improving the physical properties of resins filled with short shot-free fibers when such resins are exposed to moisture.

DETAILED DESCRIPTION OF THE INVENTION

The novel process of the present invention may be described with reference to known machinery with, in some instances, novel applications of the known machinery.

For purposes of illustration, the invention will be described in terms of mineral wool fibers although it can be used for reduction of glass fiber also. The known machinery comprises a mineral wool manufacturing facility such as those disclosed in the above cited patents. The mineral wool fibers and associated shot are then placed into a refiner so that the individual fibers are separated from their attached shot and the fibers are reduced in length to a range of shorter fibers within a narrow range of aspect ratios. Following the refining step, the mass of shortened fibers and shot are put through an air classifier where the shot is separated from the fiber and the useful short fibers are removed for packing. The shot is then also packaged and, if desired, can be recycled as part of the starting material for mineral fiber production.

For purposes of this invention it will be assumed that the mineral wool fibers have been made using the multiple rotating disc apparatus shown in the Holcomb patent. The fibers are of multiple lengths with a general distribution of from about 0.5 inches to 36 inches. The shot content was from approximately 25% to 50% of the total weight of the combined shot and fibers. Some of the shot will be individual particles, and some will still be attached to the end of the fibers. In the material investigated, the average diameter of the mineral wool fiber was 5 microns with a distribution of diameters from 1 micron to 15 microns. The aspect ratios of the unrefined mineral wool fibers varied from about $10^3$ to $10^6$. While the fibers are individualized, they nonetheless are in the form of a tangled, unwoven mat or mass of fibers.

The mineral wool fibers thus described were sent through a refiner. For convenience the conventional refiner used was one manufactured and sold by Sprout-Waldron Company, Type No. L9479, Design B. A Sprout-Waldron refiner is well known in the cellulose fiber field, although its used in mineral wool fiber field is new. The Sprout-Waldron refiner consists of a chamber with a central infeed opening having a fixed plate and a rotatable plate. The plates are generally circular in shape and have facing ribs. The plates can be adjusted relative to each other so as to establish a fixed distance or gap between their faces. A suitable power source is connected to rotatable plate to impart rotation thereto.

As is well known, the mass of fibers and shot are introduced into one end of the refiner and are moved in a spiral path from the center of the facing plates to the outer edge of the plates by the relative rotation of one plate with respect to the other. The fibers and shot are moved outwardly until the fibers emerge in shortened form at the output end of the refiner and the shot emerges relatively unaffected. Other types of disc or plug refiners may also be used. A plug refiner has a conical plug and complementary outer shell configuration and the fibers are moved with a forward linear force component in a rotating helical fashion from input to output.

The feature to be here emphasized is the fact that there is a continuous process for reducing the length of the fiber and removing the shot therefrom.

In the case of the invention, the gap was varied from almost entirely closed to an opening of about 0.140 inches or 3556 microns. The following Table I shows the relationship between the gap opening, the aspect ratio, and the percent shot passing through a 30 mesh (U.S. Sieve) screen. Table I shows the effect of two different feed rates for the mineral wool fiber into the Sprout-Waldron refiner.

Table I

| Aspect Ratio vs. Plate Gap | | |
|---|---|---|
| 1 #/Sec. Feedrate | | |
| Gap (inches) | Aspect Ratio (L/D) | Weight % Shot (Passing a 30-Mesh Screen) |
| .010 | 42 | 28 |
| .020 | 43 | 32 |
| .040 | 44 | 25 |
| .050 | 48 | 32 |
| .065 | 64 | 32 |
| .070 | 68 | 31 |
| .100 | 75 | 33 |
| 2 #/Sec. Feedrate | | |
| .030 | 31 | 25 |
| .055 | 48 | 34 |
| .070 | 71 | 38 |
| .090 | 80 | 39 |
| .100 | 100 | 37 |
| 130 | 142 | 38 |

From this table, it can be seen that there is a direct relationship between the aspect-ratio and the size of the gap opening.

The amount of shot passing a 30-mesh screen as a percent by weight of the sample is relatively constant despite gap size opening.

It is thus seen that for a desired aspect ratio of mineral fibers, a refiner can be prepared with a fixed gap opening and the fibers fed through the refiner in a continuous manner.

There is a relationship between the feed rate of the mineral wool fiber into the refiner and the aspect ratio of the fibers for a given gap size. It has been found that gap size significantly larger than those shown will not be effective in reducing fiber length.

While applicants don't wish to be held to any scientific explanation for the action in the refiner, it appears that there are two actions involved. The shot is broken away from the ends of the fibers so that almost all of the shot is reduced to individual particles and the fibers are shortened by the action of the refiner. It is felt that the refiner does not act in the manner of a chopper or guillotine, but rather causes the brittle fibers to break against each other much in the manner that strands of thin, dry spaghetti will break if forced against each other. The average length of the fiber is in the order of about 1/5 that of the gap size.

While a Sprout-Waldron refiner has been used as the device to break the shot away from the fiber and to reduce the fiber length to a narrow range of aspect ratios, the actual separation of shot and fibers may be accomplished by using an air classifier. An air classifier capable of proper separation is described in U.S. Pat. No. 3,615,009, issued on Oct. 26, 1971 of which Walter J. Norton is the inventor. This is commercially available from The Georgia Marble Company of Atlanta, Georgia. The air classifier is designed so that an airstream is recirculated through the system to separate finer particles from coarser ones. The finer particles are drawn through a particle separator which allows fine particles to pass through while rejecting coarse particles. There is a centrifugal separator into which the finer particles are drawn with the stream of air and these particles are removed from the system. The air classifier can be easily adjusted to accept particles of a given range of sizes and reject longer and smaller ones. In this device the mineral wool fibers which have a large aspect ratio are separated from the shot, and the shot content drops to below 1% by weight compared to the 25 to 50% in the mineral wool, as formed.

While the Georgia Marble air sifter has been found to be most acceptable, other air separators which are capable of separating particles of different aspect ratios can be used. Air elutriation is a known method of separating particles of different weight to surface ratios. Obviously, the weight to surface ratio of generally round particles is vastly different from that of particles having a much larger aspect ratio (length to diameter). Thus the type of separator is not critical to this invention. However, a suitable separator must be selected to accomplish the separation.

While the emphasis of the invention thus far has been the separation of shot from mineral wool fibers and the breaking of the fibers into shorter lengths, the concept of breaking fibers can be applied also to such brittle fibers as glass fibers. It has been found that glass fibers can be broken into shorter lengths and have a narrow range of aspect ratios when subjected to the process of the present invention. Even a glass fiber mat often has between about 7% to 14% of shot, as commercially produced.

The inorganic fibers produced with the narrow range of aspect ratios of about 30 to about 140 will be referred to as short fibers.

It has also been discovered that the short fibers of the present invention can be advantageously modified by reacting them with a silane in general and in particular a silane of the formula:

$$R-Si(OH)_3$$

wherein R is selected from the group consisting of:
amino-alkylene,
amino-alkylene-amino-alkylene,
vinyl,
acryloxy,
methacryloxy,
epoxy-cyclohexyl-alkylene,
glycidoxy-alkylene, and
mercapto-alkylene.

The above-described alkylene radicals generally have 1 to 10 carbon atoms and preferably have 2 to 6 carbon atoms.

The alkoxy silanes useful in the present invention can be used as such but are preferably hydrolyzed to the corresponding hydroxy silanes by well known procedures. The alkoxy silane is simply mixed with a stoichiometric amount of water at room temperature. The reaction is exothermic and cooling is employed to maintain the reaction mixture at about 0° to 40° C. The reaction is complete when the reaction mixture clarifies. Examples of suitable alkoxy silanes include among others vinyltriethoxysilane, vinyl-tris (2-methoxy-ethoxy) silane, gamma-methacryloxy-propyltrimethoxy-silane, gamma-aminopropyl-trimethoxysilane, n-beta-(aminoethyl)-gamma-aminopropyl-trimethoxy-silane, beta-(3,4-epoxy-cyclohexyl) ethyl-trimethoxysilane, gamma-glycidoxy-propyltrimethoxy-silane, gamma-mercapto-propyl-trimethoxysilane. Examples of suitable hydroxy silanes are the corresponding hydroxy silanes. Gamma-aminopropyl-trihydroxy-silane is the preferred hydroxy silane because of its reactivity.

The short fibers can be reacted with the silane in any convenient manner but are generally reacted by charging the short fibers into a blender equipped with a spray system. The silane is then sprayed onto the short fibers by means of the spray system while the blender is in operation. Widely varying temperatures are possible but the reaction is preferably carried out at 10° to 110° C. Ambient temperature is preferred. A solvent can be present or absent but is preferably absent. The silane can be reacted with the short fibers at widely varying ratios but the silane generally comprises from 0.01 to 2 and preferably 0.05 to 1 weight percent of the mixture. At much lower ratios the treated short fibers do not exhibit properties sufficiently different from untreated short fibers. Higher ratios are possible but uneconomical.

The treated short fibers are incorporated into the resin in the same manner as employed in connection with conventional fillers. The treated short fibers can comprise widely varying proportions from less than 5 to over 95 weight percent of the filled resin.

The effect of surface treating the short inorganic fibers with silanes was investigated. Property enhancements resulted from the surface treatment. The change in properties after water conditioning was studied for surface treated short fibers as well as untreated short fibers. The net effect of incorporating short fibers into a general purpose nylon 6,6 such as Zytel 101 (DuPont Company, Basking Ridge, N.J.), and into a general purpose polybutyleneterephthalate such as Celanese J-105 (Celanese Plastics, Summit, N.J.), was to achieve significant reinforcement of the resins. The short inorganic fibers used for this work had an average fiber diameter of 5 to 6 microns and an average aspect ratio of 46. The short fibers were incorporated into the resin with percentages of short fibers of 33 percent and 50 percent by weight.

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE 1

The procedure for obtaining test specimens was initially to dry the nylon 6,6 for 3 hours at 175° F. (79° C.). The short fibers and nylon 6,6 were well blended by using a 12-inch Henschel mixer for 30 seconds prior to compounding in a Brabender ¾-inch single-screw extruder. A standard nylon screw was used in the extruder. The extruder was controlled at 540° F. (282° C.) on the rear and front sections and 520° F. (271° C.) on the die. The compounded material was chipped and then injection-molded by using a 1-oz. Newbury Industries machine. Injection temperatures ranged from 520° to 580° F. (271° to 304° C.) depending on the loading of the short fibers. The die was heated to 200° F. for all samples. Test bars were produced for unfilled nylon, nylon filled with 33 weight percent short fibers, nylon filled with 50 weight percent short fibers. Samples were tested immediately after molding or kept in a desiccator until they could be tested. The testing of the injection-molded samples was carried out consistent with ASTM test procedures. The physical and thermal properties of nylon reinforced with silane treated short fibers are to be found in Table II.

EXAMPLE 2

Test bars were produced as in Example 1. Samples were water treated prior to testing by immersion in 122° F. (50° C.) water for 16 hours and then tested immediately. This was done to evaluate the effects of fiber-resin interaction with and without silane treatment of the water conditioning. Tests were carried out using unfilled nylon and nylon filled with 33 weight percent short fibers. The results of the water conditioning tests are to be found in Table III.

EXAMPLE 3

The procedure of Example 1 was followed using a general purpose polybutylene terephthalate instead of the nylon 6,6. Test results are to be bound in Table IV.

EXAMPLE 4

The procedure of Example 3 was repeated using polybutyleneterephthalate resin reinforced with 33 weight percent short fibers. The test results are to be found in Table V.

The physical properties for various resins filled with reinforcing short fibers can be enhanced when the resin and reinforcer are chemically bound by using a silane such as gamma-aminopropyl-trihydroxy-silane. The results of treating the nylon resin filled with short fibers with a silane are shown in Table II. It can be seen that at both short fiber content levels of 33 weight percent and 50 weight percent the silane enhanced the properties markedly. It is especially noteworthy that at a 50 percent loading all composite properties were improved over those of unfilled nylon or nylon filled with untreated short fibers. In short, a true reinforcement of the resin was observed at this level.

In normal usage, materials such as nylon are exposed to atmospheric moisture. This results in a pick-up of water and subsequent change in physical properties. The compounded materials were therefore water conditioned to give some indication of the relative changes that might be expected. The method of water conditioning was chosen as a convenient means of quickly observing changes. As a result, no attempt was made to equalize total water absorption. The results are shown in Table III. The dry, as-molded samples were used for comparisons. The specimens with surface-treated short fibers retained a higher percentage of the original, dry sample measurement.

Tables IV and V are similar to Tables II and III except that a general purpose polybutyleneterephthalate (PBT) was substituted for the nylon 6,6. The silane used for the surface-treatment of the resin filled with treated short fiber was gamma-aminopropyl-trihydroxy-silane in all the tests whose results are recorded in Tables II through V inclusive.

Short fibers have been shown to be an effective reinforcing agent when incorporated into a general purpose resin with enhancement of physical and thermal properties when a surface treatment with silane is applied to the fibers. The increased fiber-matrix chemical bonding was responsible for greater retention of physical strengths when the components were subjected to a moist environment. The surface treatment with silane may be recommended for long term maximum retention of properties.

In summary, the invention pertains to a novel process for treating glass or mineral wool fibers to create short silane treated fibers within a limited range of aspect ratios.

Table II

Physical and Thermal Properties of a General Purpose Nylon 6,6 Reinforced with Surface-Treated Short Fibers

| Property | Unfilled | 33 wt. % short fibers | | 50 wt. % short fibers | |
|---|---|---|---|---|---|
| | | Untreated | Treated | Untreated | Treated |
| Tensile Strength (psi) | 9,940 | 9,580 | 12,700 | 9,030 | 16,590 |
| Tensile Modulus (psi) | 294,000 | 473,000 | 495,000 | 548,000 | 608,000 |
| Izod Impact Strength (ft.-lb/in.notch) | 0.75 | 0.53 | 0.59 | 0.63 | 0.77 |
| Flexural Strength (psi) | 11,480 | 15,260 | 17,700 | 14,900 | 24,000 |
| Flexural Modulus (psi) | 181,000 | 793,000 | 731,000 | 1,163,000 | 1,230,000 |
| Heat Distortion Temperature (° F at 264 psi) | 352 | 394 | 400 | 430 | 454 |

Table III

EFFECT OF WATER CONDITIONING OF NYLON 6,6 REINFORCED WITH SHORT FIBERS

| Property | | Unfilled | 33 wt. % short fibers | |
|---|---|---|---|---|
| | | | Untreated | Surface-Treated |
| Tensile Strength | Dry* | 9,940 | 9,580 | 12,700 |
| (psi) | Wet** | 6,330 | 5,340 | 8,700 |
| Tensile Modulus | Dry | 294,000 | 473,000 | 495,000 |
| (psi) | Wet | 165,000 | 347,000 | 335,000 |
| Izod Impact Strength | Dry | 0.75 | 0.53 | 0.59 |
| (ft.-lb/in. notch) | Wet | 2.06 | 0.91 | 1.20 |
| Flexural Strength | Dry | 11,480 | 15,260 | 17,700 |
| (psi) | Wet | 6,280 | 8,300 | 11,400 |
| Flexural Modulus | Dry | 181,000 | 793,000 | 731,000 |
| (psi) | Wet | 180,000 | 391,000 | 433,000 |

*Dry: Tested as molded.
**Wet: Tested after a 16-hour soak in 50° C distilled water Table IV PHYSICAL AND THERMAL PROPERTIES OF A GENERAL PURPOSE PBT REINFORCED WITH SURFACE-TREATED SHORT FIBERS

| Property | Unfilled | 33 wt. % short fibers | | 50 wt. % short fibers | |
|---|---|---|---|---|---|
| | | Untreated | Treated | Untreated | Treated |
| Tensile Strength (psi) | 7,340 | 7,790 | 10,220 | 8,180 | 10,800 |
| Tensile Modulus (psi) | 259,000 | 441,000 | 508,000 | 589,000 | 634,000 |
| Izod Impact Strength (ft.-lb./in. notch) | 0.34 | 0.47 | 0.48 | 0.57 | 0.53 |
| Flexural Strength (psi) | 9,520 | 11,750 | 14,440 | 11,900 | 17,190 |
| Flexural Modulus (psi) | 330,000 | 815,000 | 799,000 | 1,280,000 | 1,270,000 |
| Heat Distortion Temperature (° F at 264 psi) | 165 | 359 | 354 | 386 | 386 |

Table V

EFFECT OF WATER CONDITIONING OF PBT REINFORCED WITH SHORT FIBERS

| Property | | Unfilled | 33 wt. % short fibers | |
|---|---|---|---|---|
| | | | Untreated | Surface-Treated |
| Tensile Strength | Dry* | 7,340 | 7,790 | 10,220 |
| (psi) | Wet** | 6,960 | 6,300 | 7,650 |
| Tensile Modulus | Dry | 259,000 | 441,000 | 508,000 |
| (psi) | Wet | 246,000 | 392,000 | 441,000 |
| Izod Impact Strength | Dry | 0.34 | 0.47 | 0.48 |
| (ft.-lb./in. notch) | Wet | 0.46 | 0.31 | 0.36 |
| Flexural Strength | Dry | 9,520 | 11,750 | 14,440 |

Table V-continued
EFFECT OF WATER CONDITIONING OF PBT REINFORCED WITH SHORT FIBERS

| Property | | Unfilled | Untreated | 33 wt. % short fibers Surface-Treated |
|---|---|---|---|---|
| (psi) | Wet | 8,270 | 8,670 | 11,840 |
| Flexural Modulus | Dry | 330,000 | 815,000 | 799,000 |
| (psi) | Wet | 283,000 | 640,000 | 679,000 |

*Dry: Tested as molded.
**Wet: Tested after a 16-hour soak in 50° C distilled water.

What is claimed is:

1. The method of producing inorganic short fibers within a preselected narrow range of aspect ratios from about 30 to about 140 comprising the steps of making a mass of individual, inorganic fibers having diameters within a prescribed range and having a range of aspect ratios substantially from $10^3$ to $10^6$, said mass further having not less than about 7% shot by weight; putting said mass of fibers through a refiner, said refiner having at least one rotating plate element and a second plate element at a fixed distance from and in facing relation to said one rotating element to reduce the length of said fibers, said fixed distance being substantially less than the lengths of a major quantity of said fibers and greater than the size of said shot and subjecting said refined fibers to the action of a separator whereby fibers with said preselected narrow range of aspect ratios are produced with less than 1% shot, and then reacting the separated short fibers with a silane of the formula:

$$R-Si(OH)_3$$

wherein R is selected from the group consisting of:
amino-alkylene,
amino-alkylene-amino-alkylene,
vinyl,
acryloxy,
methacryloxy,
epoxy-cyclohexyl-alkylene,
glycidoxy-alkylene, and
mercapto-alkylene.

2. The method of producing inorganic short fibers having a preselected range of aspect ratios comprising the steps set forth in claim 1 in which said mass of fibers is moved in a generally spiral path.

3. The method of producing inorganic short fibers having a preselected range of aspect ratios comprising the steps set forth in claim 2, and the step of applying a forward linear force component to said fibers simultaneously with said spiral path movement.

4. The process of claim 1 wherein the reacting is effected by mixing the silane and the separated short fibers at a temperature of 10° to 110° C. in the absence of a solvent.

5. The process of claim 1 wherein the reacting is effected by mixing the silane with the separated short fibers such that the silane comprises 0.01 to 2.0 weight percent of the mixture.

6. The process of claim 1 wherein the silane is gamma-aminopropyl-trihydroxy-silane.

7. The method of producing inorganic short fibers within a preselected narrow range of aspect ratios from about 30 to about 140 comprising the steps of making a mass of individual, inorganic fibers having diameters within a prescribed range and having a range of aspect ratios substantially from $10^3$ to $10^6$, said mass further having not less than about 7% shot by weight; putting said mass of fibers through a refiner, said refiner having at least one rotating plate element and a second plate element at a fixed distance from and in facing relation to said one rotating element to reduce the length of said fibers, said fixed distance being substantially less than the lengths of a major quantity of said fibers and greater than the size of said shot and subjecting said refined fibers to the action of a separator whereby short fibers with said preselected narrow range of aspect ratios are produced with less than 1% shot, and then reacting the separated short fibers with gamma-aminopropyl-trihydroxy-silane, by mixing the separated short fibers with the silane such that the silane comprises 0.05 to 1 weight percent at a temperature of 10° to 110° C. in the absence of a solvent.

* * * * *